(12) United States Patent
Dubrovin et al.

(10) Patent No.: US 7,280,901 B2
(45) Date of Patent: Oct. 9, 2007

(54) METHOD OF CONTROL OF LIGHT BEAMS EMITTED BY A LIGHTING APPARATUS OF A VEHICLE AND A SYSTEM FOR PERFORMING THIS METHOD

(75) Inventors: Alex Dubrovin, Bobigny (FR); Alain Dari, Saint Clement (FR); Sidy Ba, Bobigny (FR); Patrick Lacombe, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 438 days.

(21) Appl. No.: 10/697,182

(22) Filed: Oct. 29, 2003

(65) Prior Publication Data

US 2004/0085201 A1 May 6, 2004

(30) Foreign Application Priority Data

Oct. 30, 2002 (FR) .................................. 02 13898

(51) Int. Cl.
*G06F 7/00* (2006.01)
(52) U.S. Cl. ........................ 701/49; 701/200; 701/36; 307/9.1
(58) Field of Classification Search ................ 701/49, 701/36, 200; 362/464–466, 475; 356/121; 307/9.1, 10.1
See application file for complete search history.

(56) References Cited

U.S. PATENT DOCUMENTS 5,588,733 A * 12/1996 Gotou .......................... 362/37
6,049,749 A * 4/2000 Kobayashi ..................... 701/49
6,343,869 B1 * 2/2002 Kobayashi ..................... 362/37
6,459,387 B1 * 10/2002 Kobayashi et al. ......... 340/988
2002/0036907 A1 3/2002 Kobayashi et al.
2002/0080617 A1 * 6/2002 Niwa et al. .................. 362/465
2002/0080618 A1 * 6/2002 Kobayashi et al. ......... 362/466

FOREIGN PATENT DOCUMENTS

EP  1 415 856   2/2006
FR  2 812 844   2/2002

OTHER PUBLICATIONS

French Search Report, Aug. 5, 2003.

* cited by examiner

*Primary Examiner*—Yonel Beaulieu
(74) *Attorney, Agent, or Firm*—Morgan & Finnegan, L.L.P.

(57) ABSTRACT

A system for controlling at least one beam of light emitted from a lighting apparatus in a vehicle. The control system may, in at least one embodiment, control the lighting apparatus based on road navigation data and/or vehicle sensor data. The road navigation data may include information related to the form of the road and a reliability rate. If the reliability rate of the road navigation data is higher than a threshold value, then the road navigation data may be used in conjunction with the vehicle sensor data. If the reliability rate of the road navigation data is lower than threshold value, then only the vehicle sensor data may be used to control the lighting apparatus.

16 Claims, 3 Drawing Sheets

METHOD OF CONTROL OF LIGHT BEAMS EMITTED BY A LIGHTING APPARATUS OF A VEHICLE AND A SYSTEM FOR PERFORMING THIS METHOD

FIELD OF THE INVENTION

This invention relates to a method of controlling light beams projected by a lighting apparatus of a vehicle on a road, as a function of the geometry of the said road. The invention also relates to a system for performing the said method.

The invention is applicable in the field of vehicles travelling on roads, such as motor vehicles or heavy goods vehicles for example. In particular, it is applicable in the field of projection of light by such vehicles.

STATE OF THE ART

Because of the high number of vehicles travelling on roads, it is necessary to give these vehicles a lighting system which is adapted in the best is possible way, firstly to the road on which they are travelling, and secondly to their driving conditions. In particular, at night or in bad weather (such as in fog, rain etc.), it is important that the driver be able to have the best possible visibility of the road that extends in front of him, and the verges of the road. In other words, as to safety questions, it is desirable to improve lighting of the scene in front of the vehicle and thus to improve visibility of this scene by the driver of a vehicle.

Conventionally, there exist on motor vehicles two types of lighting: so-called "cruising" lighting which illuminates the whole of the road over a long distance, and "passing lighting" which illuminates the road over a short distance in order to avoid dazzling drivers of vehicles travelling in the opposite direction. Illumination of the road is achieved by means of main beam headlights, each of which emits a light beam which is directed towards the horizon. Passing or dipped lighting is obtained by means of passing or dipped headlights, each of which emits a sheet of light directed downwards and giving visibility over a distance of the order of 60 to 80 metres.

In order to improve this illumination, it is desirable to orientate the light emitted by the headlights as a function of the geometry of the road. In other words, it is desirable for the headlights to "follow" the road, that is to say they illuminate straight in front of the vehicle when the road is straight, and they illuminate in front of the vehicle to the right or the left when the road has a bend to the right or the left respectively.

Lighting apparatuses adapted to follow the road are already known, this new function usually being known as "Bending Light". Such apparatus generally uses data available on the vehicle in order to determine the geometry of the road. Some of these apparatuses incorporate a steering wheel angle sensor which supplies information about the path or trajectory followed by the vehicle. In that case, illumination of the road is a function of the behaviour of the driver. For example, if the driver turns the steering wheel of the vehicle to the right, the headlights of the vehicle are then directed towards the right-hand side of the road, assuming that in this case there is a right-hand bend. On the other hand, if the driver does not move his steering wheel, the headlights will illuminate straight in front of the vehicle, as is normally the case when moving in a straight line or just before the curve of a bend. Such an apparatus has no knowledge of the form of the road ahead, and there are therefore delays before it starts to illuminate the bend. For the driver, this results in awareness that on entry to the bend, the light beam comes late, and an awareness that the light beam returns too slowly to the axis of the vehicle at the end of the bend. This delay in changing the orientation of the headlights involves not only discomfort for the driver, but also a loss of safety because there exists, on each change of curvature of the road, an instant during which the road is incorrectly illuminated. In addition, with such apparatus the orientation of the headlights depends only on the behaviour of the driver. Moreover, if the driver carries out a wrong movement of the steering wheel of the vehicle, for example by turning it back for a moment while removing something from the glove box, the orientation of the headlights is suddenly modified, even though the geometry of the road has not changed.

A further known lighting apparatus makes use of internal information of the vehicle which allows a certain amount of anticipation to take place. For example, just before the end of a bend, even though the steering wheel is still at the angle corresponding to the curvature, the driver will commonly accelerate because he can see the end of the bend and a straighter part of the road than that which he has just been passing along. Such an apparatus makes use of this combination of circumstances to begin returning the light beams to their central position. On the other hand, the opposite information cannot be used. In this connection, when the driver sees a bend ahead, he will generally apply the brakes. However, it is not possible to know, simply from the fact of braking, whether the conductor is braking because of a right-hand bend, or a left-hand bend, or again because there is an obstacle in front of him which has obliged him to apply the brakes. This type of apparatus does enable the lighting of the road to be anticipated a little, but only in some cases.

Certain other known lighting apparatuses make use of data given out by a navigation system. This navigation system associates the data supplied by a mapping system with the indications given by the GPS of the vehicle. Such a navigation system enables the geometry of the road to be known in advance. For example, it is possible to identify in advance the bends which are going to appear in the road, at a given distance. It is therefore possible, relying on the information supplied by the navigation system, to pre-orientate the light beams of a vehicle, and thus to anticipate the illumination of the road. Such apparatuses are described in particular in the documents EP 780 823 and EP 887 229.

However, current navigation systems are still very imprecise. It often happens that, at a given location, the information is either absent or obsolete (in the case of roadworks, a new road, and so on). There are even entire zones of the country and the world which are not covered by the databases used by the mapping system. It also happens that the information supplied by the navigation system is in error. This can in particular be the case when there is disturbance of one of the sub-systems of the navigation system, such as that in the GPS signal between twists in the road, or in short tunnels. This can also be the case due to the fact that the driver, who may for example arrange to go to a place A which he has memorised in his navigation system, and later, during the journey, he may decide to go to a place B and not follow the directions indicated by the navigation system. All of these situations can give rise not only to mediocre performance, but also to performance which is dangerous because of its unreliability.

DISCLOSURE OF THE INVENTION

The object of the invention, in short, is to overcome the disadvantages of the techniques described above. To this end, the invention proposes a control system for the headlights of a vehicle which makes use both of the information supplied by the navigation system and of the information supplied by one or a plurality of sensors, in particular sensors of dynamic parameters of the vehicle, such as the steering wheel angle sensor or the speed sensor. To this end, the invention proposes to carry out a set of tests for consistency before determining what control strategy will be retained. The first consistency test concerns that of the navigation system, and consists in establishing its reliability rate. This rate is a value which is calculated from the degree of consistency achieved by the navigation system between information received from the mapping system, from the GPS, and from various on-board sensors. It indicates in a standardised way the degree of certainty in the information given out by the system. If the reliability rate is satisfactory, that is to say it is higher than a threshold value determined beforehand, then the navigation information can be taken into account in the remainder of the control strategy for the headlights. If the rate is insufficient, then it is chosen that essentially only the information from the sensor or sensors, which are in particular of dynamic type, will be chosen to be taken into account.

More precisely, the invention provides a method of controlling light beams emitted by a lighting apparatus of a vehicle travelling on a road, as a function of the geometry of the said road, the method comprising the steps of:

sensing, by means of at least one sensor on the vehicle, at least one item of information relating to the dynamic behaviour of the vehicle, in particular with the aid of one or more dynamic sensors, obtaining a set of navigation data, in particular comprising the form of the road and a reliability rate, derived in particular from a navigation system using GPS for example.

comparing the reliability rate with a predetermined reliability threshold value;

if the reliability rate is higher than the reliability threshold value, determining a command to be applied to the lighting apparatus taking the data from the navigation system into account, then making a comparison with a command which has regard only to the item or items of information relating to the dynamic behaviour of the vehicle.

This comparison is preferably carried out by taking into account a plurality of cycles of preceding steps/calculations, by iteration. It determines whether large inconsistencies appear (such as antagonistic or oscillating or violent actions). The effective command to be applied is determined as a result of this comparison.

If the reliability rate is lower than the reliability threshold value, the command is applied, determining in particular a new angular position for the headlights. In this event (when inconsistencies have accordingly not appeared), this lighting command is then based (only) on data supplied by the dynamic sensors, which are believed to be reliable.

The invention also provides a system for performing the above mentioned method, it comprises a control system for controlling light beams emitted by a lighting apparatus of a vehicle travelling on a road as a function of the geometry of the said road, comprising at least one sensor connected to the vehicle and giving information relating to the behaviour of the vehicle. This system is characterised by the fact that it comprises:

an on-board navigation system, an apparatus for processing information supplied by the sensor and by the navigation system, and command means for the lighting.

DETAILED DESCRIPTION OF EMBODIMENTS OF THE INVENTION

Figure 1:
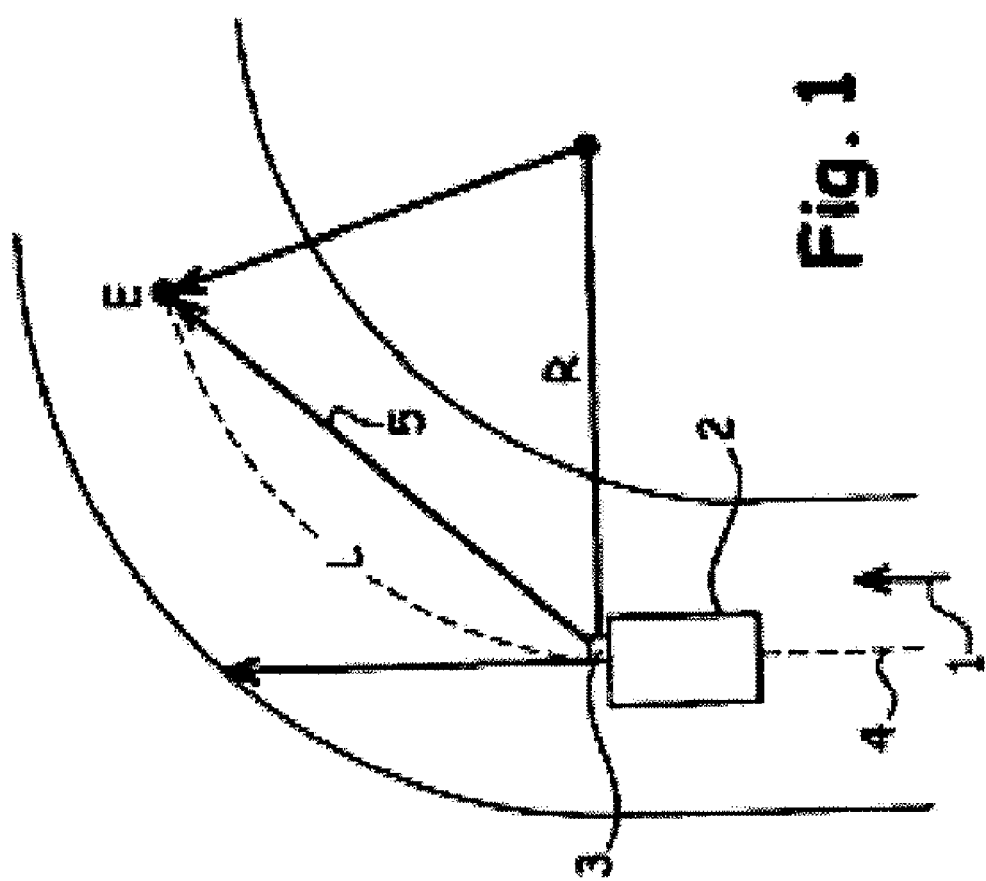
FIG. 1 shows diagrammatically the path followed by a vehicle on a road, for which the light beams are required to be directed in the optimum way.

FIG. 1 shows a road 1 on which there is travelling a vehicle 2 having headlights 3, also referred to as lighting apparatus. The road 1 has a verge on the right, having a radius of curvature R. FIG. 1 shows in broken lines the path or trajectory 4 which will be followed by the vehicle 2, and therefore the direction, along this path, which it is desired that the light beams from the headlights of the vehicle shall follow.

In order to determine the position of the light beams of the headlights of the vehicle on the road, a distance L, referred to as the relevant distance, can be calculated. This relevant distance L is the curvilinear distance between the point of emission of the light beams, that is to say approximately the location of the headlights, and the illumination point E seen on the trajectory of the vehicle, the illumination point E corresponding to the intersection between the desired direction of illumination and the middle of the path shown as a broken line.

The relevant distance L can be a function of various parameters linked to the behaviour of the vehicle, such as the speed of the vehicle or the geometry of the road, for example the profile of the road.

The navigation system, which is able to supply predictive information describing the assumed road, together with any intersections, enables fine calculation of the relevant distance L to be carried out. For example, when the vehicle is approaching a very tight bend, in a so-called hairpin, or if it is on an uphill road with hairpin bends, that is to say where right-hand and left-hand bends occur alternately in succession, it is wise to be able to make use of the information supplied by the navigation system in order to determine the angles of orientation of the headlights.

However, as explained above, the indications supplied by the navigation system may be non-existent or in error. The method of the invention therefore proposes to verify the consistency of this information as supplied is by the navigation system, by basing itself on the information supplied by the sensors on board the vehicle, such as the steering angle sensor, the speed sensor, the acceleration sensor, and so on.

More precisely, in the method of the invention it is proposed to provide a step in which there is permanent verification as to whether there is consistency between the description of the road received by the navigation system and the trajectory which is effectively followed by the vehicle, and in particular the trajectory already travelled by the vehicle. This travelled trajectory is determined from information supplied by the on-board sensors. The object of this consistency verification is to mitigate operational errors, such as travel over a path that does not exist, or failure to respect any instructions for guidance of the navigation system by modification of the destination without the navigation being displayed. In the case of error detection, the method according to the invention ensures a progressive return towards a control law which is based on the vehicle sensors.

In other words, the method of the invention can include a step which consists in confronting the information issued by the navigation system with the information coming from the on-board sensors, and verifying whether there is consistency between these two types of information and/or any errors between these two types of information. Where consistency does exist, then the information coming from the navigation system is taken into account in the control of the angle of rotation of the headlights of the vehicle, that is to say the angle by which the light beams have to be deflected with respect to their current position. In the opposite case, if there is no consistency, that is to say if there is an error between the two types of information, then priority is given to the information from the on-board sensors. The information from the navigation system is then not taken into account. Only the information from the on-board sensors is taken into account in controlling the rotation of the headlights. The method of the invention is said to take the form of predominance of the "steering wheel law" over the "navigation law". The method of the invention therefore manages transmissions in deflection between one or other of the laws so as not to cause disturbances or inconveniences for the driver.

In other words, the method of the invention provides, in particular, verification as to whether the reliability rate of the navigation law is correct, that is to say above a predefined threshold value, and a comparison of the navigation information with a set of so-called historic data based on the vehicle sensors, so as to eliminate any risk of acting in error on the lighting system. The historic data are essentially those which relate to the last positions to have been adopted by the lighting system. The information supplied by the navigation system (examples of which are the reliability rate, the line of the road, the descriptions of roadworks, or intersections) are information which is obtained by fusion of the data supplied by the mapping system and data supplied by the GPS of the vehicle, together, if appropriate, with data supplied by various sensors which may or may not be incorporated in the navigation system. The reliability rate enables the level of reliability of the information supplied by the navigation system to be known. For example, if the GPS is non-existent at a given location, then the reliability rate is very poor. It will be noted that, on the other hand, the information supplied by most of the dynamic sensors is reliable because it is based on real happenings. The reliability rate is compared with a threshold value below which it is estimated that the navigational data cannot be used. Thus, as a function of the reliability rate which has been determined, the method of the invention decides to taken into account the information supplied by the navigation system, or not to take it into account. It is also possible to mix the information from the navigation system with the information from the on-board sensors. This can for example be the case where the reliability rate as to the location of the vehicle is in the course of being reduced but is not below the predetermined threshold. This mixing between the navigation law and the steering wheel law is effected "gently", that is to say without any sudden or accidental or over-repetitive behaviour.

When the navigation system is not in guiding mode, it is impossible to determine with any certainty what route the driver should take when he is approaching an intersection. Observation of the direction indicator, of a change of route, of the steering wheel angle, and so on, are a few indicators which may enable the eventual choice of one of the routes to be favoured. The invention will permit rapid return to the dynamic sensors if the preview turns out to be erroneous.

Figure 2:
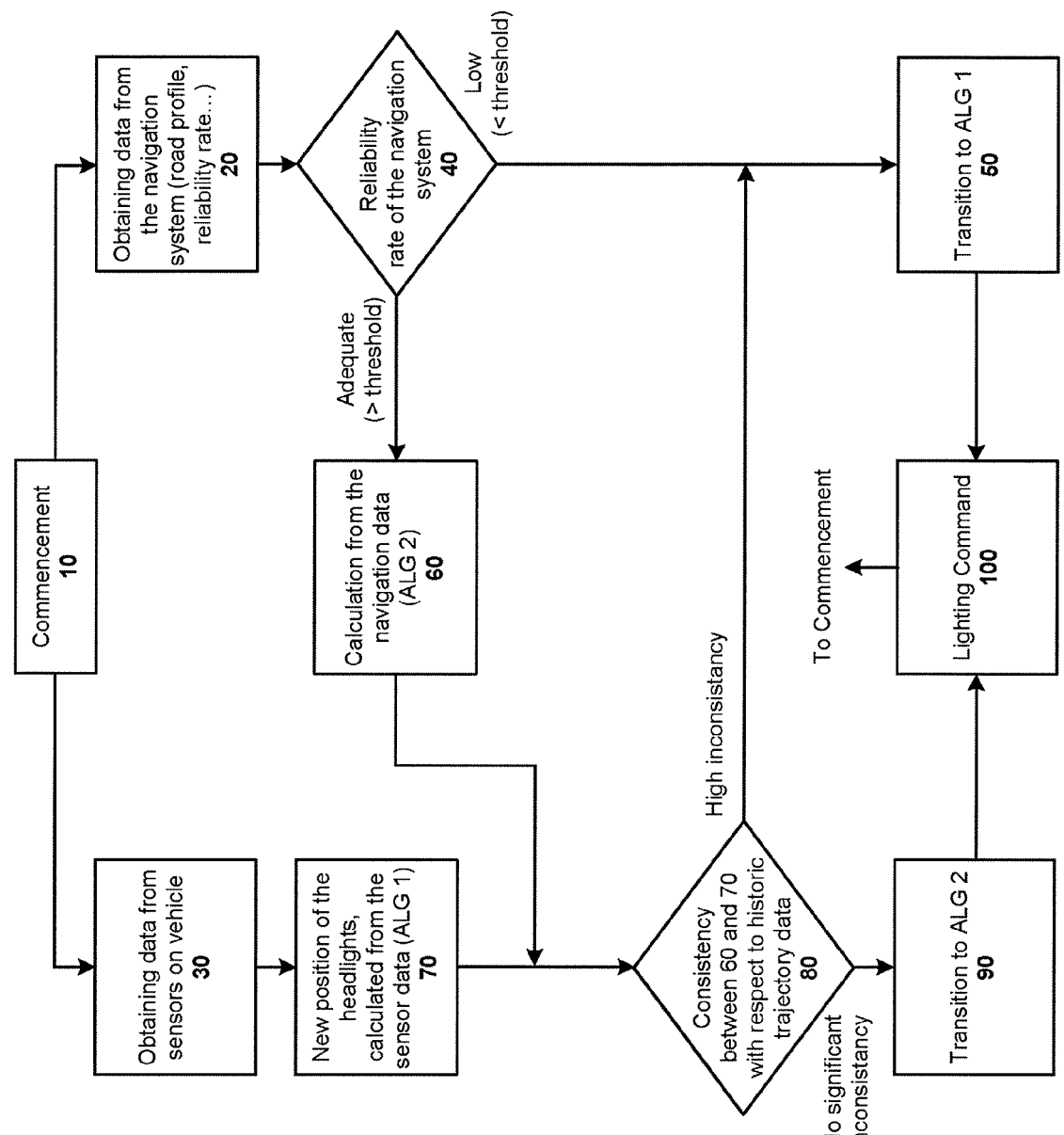
FIG. 2 is the operating diagram for the different steps of the method of the invention.

FIG. 2 is the operating diagram of the various steps in the method of the invention. The object of this method is to control the light beams emitted by the headlights of the vehicle in an anticipatory way. This method can be carried out once the driver has decided to turn on his headlights. It can also be carried out permanently once the driver turns on the ignition, that is to say once the engine of the vehicle is running. The commencement of operation in the method of the invention is denoted by the reference 10 in FIG. 2.

The method of the invention consists firstly in collecting the information from the navigation system (step 20), in parallel, the information emitted from an on-board sensor (or several sensors, according to what version is concerned), such as the steering wheel angle sensor (step 30).

The method then consists in evaluating the reliability rate of the navigation system data (step 40). This reliability rate is an item of information supplied by the navigation system itself. If the reliability rate is low, that is to say it is below a predefined threshold value, then the navigation system data is not taken into account. The angle of rotation of the headlights is then determined, in step 50.

In this step 50, in particular, an algorithm ALG1 is brought into use, which only employs the data from the sensors. In this way a theoretical angle of rotation is obtained for application to the headlights, this theoretical angle of rotation only taking into account the data from the sensors of the vehicle. In order not to cause excessively violent rotation, it is arranged that, still within step 50, the theoretical angle of rotation is compared with a set of so-called historic items of data which, in particular, include information relative to the preceding positions of the lighting apparatus. If the preceding position is very far away from the theoretical position which is to be achieved, it is arranged that there is a progressive change in the position of the lighting apparatus towards the theoretical position, the speed of this progression being quantifiable. Several cycles of the operating diagram may therefore be necessary in order to reach the theoretical position supplied by the algorithm ALG1. The progression of the lighting equipment towards its theoretical position, obtained with the aid of an algorithm which may be algorithm ALG1 or an algorithm ALG2, the function of which will be explained later herein, are referred to as a smoothing operation.

If the reliability rate is correct, that is to say it is above the predefined threshold value, the theoretical angle of rotation of the headlights is then calculated in step 60, by an altorithm ALG2 which makes use of the navigation system data. In parallel with this, algorithm ALG1 systematically calculates, in a step 70, the theoretical position which should in theory be adopted by the lighting equipment if it were solely the data from the sensors of the vehicle that had to be taken into account.

The process is then continued by carrying out a contrast, or comparison, (step 80) between the results obtained on the one hand at the end of step 70, and on the other hand at the end of step 60. This step enables any inconsistency between the results of those two steps, which make use of different algorithms working with different parameters, to be measured.

If the inconsistency is small (in other words if consistency is good), control of rotation of the headlights is then commanded as a function of the calculations carried out in the course of a step 90. This step works in a similar way to step 50, with the algorithm ALG1 replaced by algorithm ALG2, and it takes as its parameter, no longer only the data from the vehicle sensors, but also the data from the navigation system. Also as in step 50, a smoothing operation towards the theoretical position obtained by means of algorithm ALG2 is carried out.

If the inconsistency is significant (in other words if inconsistencies have been found), then the process is repeated at the level of step 50 of the operating diagram. The notion of inconsistency is applied on historic data and on a set of identified figurative circumstances. For example, if the navigation system describes a straight road between the vehicle and the point E, and if the angle of the steering wheel becomes very different from zero, it is likely that the driver is on a path which does not exist in the mapping system. On the other hand, the angles of rotation of the headlights resulting from ALG1 and ALG2 can here be very different in value without being inconsistent with each other.

A final step 100 consists in transmitting to the lighting apparatuses lighting commands which are formulated in the course of step 90 or step 50. The cycle of the procedure is then repeated at the level of step 10.

As mentioned earlier herein, it is possible to have regard to the data coming from a single on-board sensor, such as the steering wheel sensor, or again from a plurality of on-board sensors.

Figure 3:
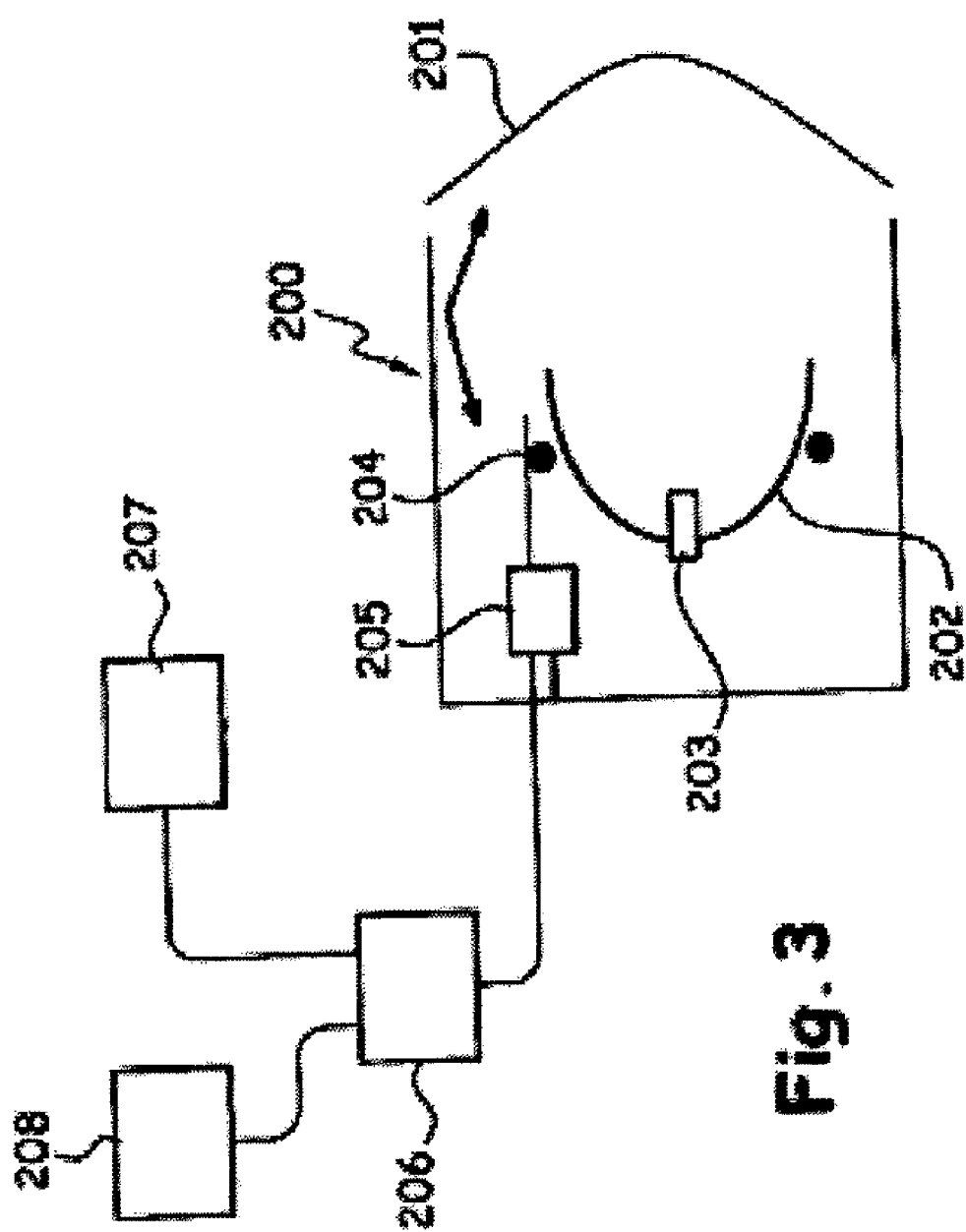
FIG. 3 shows a motor vehicle headlight with the lighting control system of the invention.

FIG. 3 shows a vehicle headlight with the control system of the invention. This Figure shows a headlight 200 having an optic or cover glass 201 and a light source 203 which is mounted on a movable support 202. This support 202 is actuated by a motor 205 associated with a rotation device 204, such as a ball joint.

The system of the invention also includes a data processing unit which receives data from the on-board sensor 207 and the navigation system 208. This processing device 206 performs steps 20 to 100 of the method of the invention, and passes command information to the motor 205. The processing device may be the lighting control unit, or the navigation system itself, or any unit for computing or electronic processing on the vehicle.

The sensor 207 may be a sensor of the vehicle itself, internal or external with respect to the navigation system, for example the speed sensor, acceleration sensor, steering wheel angle sensor, road bend sensor, or force sensor. The sensor 207 may also consist of a plurality of sensors. It can also be a peripheral sensor such as a camera, a fog detector or a white line detector. Among the sensors there may also be considered the flashers which supply information in real time as to the behaviour of the driver of the vehicle.

The dynamic sensors of the vehicle in general supply information which is reliable because it is measured in real time. On the other hand, some peripheral sensors, such as the white line sensor, supply information which cannot be taken into account by itself. In this connection, in the case of the white line detector, the marks on the ground may be wholly or partly effaced or even obscured by the effect of rain on the road, which can render the information erroneous. This information may however be of relevance in some cases in order to anticipate the trajectory of the vehicle, where it is associated with other information supplied by other sensors on the vehicle. This information can also be mixed with the information from other sensors.

In a modified version of the invention, this information coming from the white line detector can be substituted for the information given by the navigation system, when the reliability rate of the latter is too low.

It is also possible to use as a sensor a camera which is fixed on the vehicle. This camera supplies a profuse number of pixels, and in consequence supplies a large quantity of data. This data can also be tested in order to know whether it is relevant or not. In that case, it is possible to calculate an index of reliability of the information supplied by the camera, and to take account of this information, or not to do so, as a function of this reliability index.

The navigation system 208 includes a GPS and a mapping system, which are conventionally associated with each other to enable the driver to be supplied with indications as to the path to follow. This navigation system accordingly gives out information about vehicle position, description of the assumed route, and description of crossroads or intersections via a dedicated link, for example a serial connection or a multiplexing network such as a CAN network.

This navigation system associated with the on-board sensors on the vehicle constitutes an environment which is sufficient to enable the lighting computer, or data processing device, to make good use of the available information from the navigation system, and therefore to improve the lighting function of the vehicle. In practice, it is enough that the lighting computer is able to interface with the navigation system so as to receive the above mentioned information.

The method of the invention just described may be employed in a number of applications to make them more reliable. A first application is that which has been described above relating to the orientation of the headlights of a vehicle.

Another application concerns lighting of the road by a vehicle passing from a country with driving on the right to a country with driving on the left, or vice versa. For example, where a vehicle comes from England and enters France, the direction and/or form of the light beams can be automatically modified in such a way as to illuminate mainly the right-hand side of the vehicle, as is the case for a vehicle destined to travel in France. In this case, the navigation system enables it to be known whether the vehicle is in France or in England, and in consequence the control of lighting orientation can be performed automatically.

Yet another application concerns entering or leaving a tunnel, a car park, or any dark zones. In this case, if the navigation system supplies a relevant item of information, then the headlights of the vehicle can be illuminated before the vehicle enters the dark zone. In this case, what is controlled is no longer the orientation of the light beams, but switching them on and switching them off.

A further application of the invention is town lighting. In this application, if the navigation system supplies a relevant item of information, that is to say if the reliability rate is high, then it can be arranged that, when the vehicle reaches an intersection, the light beam is flattened and widened in order to improve visibility for the driver and for pedestrians, and on the other side of the road. In this application, control of the headlights is concerned with not only their orientation but also the size of their beams.

Yet a further application of the invention concerns driving on motorways. In this application, when the navigation system foresees that the vehicle will be entering a motorway, it adapts the lighting system of the vehicle for motorway driving. The invention is thus able to be adapted for all the functions that necessitate movement of one or more elements contained in a headlight, which fall, in particular, into the category of Advanced Front-lighting Systems.

What is claimed is:

1. A method for controlling a lighting apparatus in a vehicle traveling on a road as a function of the geometry of the road, comprising:
    sensing, by means of at least one sensor vehicular information relating to the dynamic behavior of the vehicle,
    obtaining navigation data, including at least road geometry and a reliability rate,
    comparing the reliability rate with a predetermined reliability threshold value;
    if the reliability rate is higher than the reliability threshold value, further comparing trajectory information derived from the vehicular information to trajectory information derived from the navigation data to determine a consistency level, the consistency level being utilized to decide whether to employ the vehicular trajectory information or navigation trajectory information in controlling the lighting apparatus; and
    if the reliability rate is lower than the reliability threshold value, controlling the lighting apparatus using the vehicular trajectory information.

2. The method of control according to claim 1, wherein the vehicular information includes a plurality of items of information relating to the behavior of the vehicle.

3. The method of control according to claim 1, wherein it includes a smoothing operation for the control data.

4. The method of control according to claim 1, wherein the control of the lighting apparatus is for orientation of the light beams.

5. The method of control according to claim 1, wherein the control of the lighting apparatus is for selection of the size and/or form of the light beams.

6. The method of control according to claim 1, wherein the control of the lighting apparatus consists in switching on or switching off the light beams.

7. A control system for controlling a lighting apparatus in a vehicle traveling on a road as a function of the geometry of the road, comprising:
    at least one sensor connected to the vehicle and giving information relating to the behavior of the vehicle;
    an on-board navigation system;
    an apparatus for processing information supplied by the sensor and by the navigation system in order to determine whether the reliability rate of information supplied by the navigation system meets a minimum reliability level, and whether the information supplied by the navigation system is consistent with regard to the sensor information relating to the behavior of the vehicle; and
    a controller for the lighting apparatus.

8. The control system according to claim 7, wherein the navigation system includes at least one mapping system and a GPS.

9. The control system according to claim 7, wherein the sensor is a sensor monitoring the vehicle itself.

10. The control system according to claim 7, wherein the sensor is a peripheral sensor.

11. The control system according to claim 7, wherein it includes a plurality of sensors monitoring the vehicle itself and/or peripheral sensors.

12. The control system according to claim 9, wherein the vehicle sensor is a steering wheel angle sensor, or a sensor for the speed of the vehicle, or a road bend sensor, or a radial force sensor.

13. The control system according to claim 10, wherein the peripheral sensor is a camera or a white-line detector or a fog detector.

14. An automotive lighting apparatus using the control system claimed in claim 7.

15. A motor vehicle equipped with at least one lighting system according to claim 14.

16. A method for controlling a lighting device in a vehicle traveling on a road according to the geometry of the road, comprising:
    capturing, by at least one sensor, vehicular information relating to the dynamic behavior of the vehicle and determining a first lighting command based solely on the vehicular information;
    obtaining navigation information comprising at least the shape of the road and a confidence level for the said navigation information, comparing the confidence level with a previously determined confidence threshold;
    if the confidence level is lower than the confidence threshold, applying the said first lighting command to the lighting device; and
    if the confidence level is higher than the confidence threshold:
    determining a second lighting command based on the navigation information;
    comparing the said first and second lighting commands;
    applying the second lighting command to the lighting device when a difference between the said first and second lighting commands is lower than a predetermined threshold; and
    applying the first lighting command to the lighting device when a difference between the said first and second lighting commands is higher than a predetermined threshold.

* * * * *

UNITED STATES PATENT AND TRADEMARK OFFICE
CERTIFICATE OF CORRECTION

PATENT NO. : 7,280,901 B2 Page 1 of 1
APPLICATION NO. : 10/697182
DATED : October 9, 2007
INVENTOR(S) : Dubrovin et al.

It is certified that error appears in the above-identified patent and that said Letters Patent is hereby corrected as shown below:

On the Cover Page:

Item (75), line 1: The first named inventor "Alex Dubrovin" should be changed to --Alexis Dubrovin;--

Section (56): --The references U.S. 2002/080618 to Sugiyama et al. and U.S. 2002/080617 to Shimado et al., filed on March 21, 2007 and acknowledged by the Examiner on May 27, 2007,-- should be included in the "U.S. PATENT DOCUMENTS" section of the "References Cited."

Signed and Sealed this

Third Day of June, 2008

JON W. DUDAS
*Director of the United States Patent and Trademark Office*